US010521375B2

(12) United States Patent
Liu (10) Patent No.: US 10,521,375 B2
(45) Date of Patent: Dec. 31, 2019

(54) CONTROLLER FOR A MEMORY SYSTEM

(71) Applicant: MACRONIX INTERNATIONAL CO., LTD., Hsinchu (TW)

(72) Inventor: Ting-Yu Liu, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 188 days.

(21) Appl. No.: 15/630,075

(22) Filed: Jun. 22, 2017

(65) Prior Publication Data

US 2018/0373655 A1    Dec. 27, 2018

(51) Int. Cl.
*G06F 13/26*  (2006.01)
*G06F 13/30*  (2006.01)
*G06F 12/10*  (2016.01)

(52) U.S. Cl.
CPC .............. *G06F 13/26* (2013.01); *G06F 13/30* (2013.01); *G06F 12/10* (2013.01)

(58) Field of Classification Search
CPC .. G06F 12/0246; G06F 3/0679; G06F 3/0659; G06F 3/0604; G06F 2212/7205; G06F 3/0652; G06F 3/0613; G06F 2212/7211; G06F 2212/1016; G06F 2212/2022; G06F 2212/214
See application file for complete search history.

(56) References Cited

U.S. PATENT DOCUMENTS

| 8,635,477 B2 * | 1/2014 | Judd ........................ G06F 1/324 713/320 |
| 8,762,620 B2 | 6/2014 | Prins et al. |
| 8,819,328 B2 | 8/2014 | Lassa et al. |
| 2008/0307192 A1 | 12/2008 | Sinclair et al. |
| 2011/0138100 A1 | 6/2011 | Sinclair |
| 2014/0201473 A1 | 7/2014 | Falanga et al. |
| 2014/0215123 A1 | 7/2014 | Baryudin et al. |

(Continued)

FOREIGN PATENT DOCUMENTS

| TW | 201019108 A | 5/2010 |
| TW | I418989 B | 12/2013 |
| TW | I531965 B | 5/2016 |

OTHER PUBLICATIONS

Gupta, et al., DFTL: a flash translation layer employing demand-based selective caching of page-level address mappings, ASPLOS XIV, Proc. of the 14th Int'l Conf. on Architectura Support for Programming Languages and Operating Systerms, vol. 44. No. 3. pp. 229-240, Mar. 7-11, 2009, Washington, DC, USA.

*Primary Examiner* — Idriss N Alrobaye
*Assistant Examiner* — Richard B Franklin
(74) *Attorney, Agent, or Firm* — Haynes Beffel & Wolfeld LLP (57) ABSTRACT

A controller for a memory system is disclosed. The controller includes logic configured to execute host requests and memory management operations. The memory management operations have a plurality of memory command cycles. The logic is configured to suspend the memory management operation upon completion of a memory command cycle in the plurality of memory command cycles before a final stage when a host read request is received during execution of the memory management operation, and configured to continue the memory management operation when a host request other than a read request is received during execution of the memory management operation.

20 Claims, 4 Drawing Sheets

(56) References Cited

U.S. PATENT DOCUMENTS

2014/0325131 A1 10/2014 Lassa et al.
2015/0006786 A1 1/2015 Cabrera et al.
2017/0269870 A1* 9/2017 So .......................... G06F 3/061

* cited by examiner

CONTROLLER FOR A MEMORY SYSTEM

BACKGROUND

Field

The present technology relates to a memory system, in which a host reads data from or writes data to a memory, such as NAND flash memory, through a controller.

Description of Related Art

Data processing systems are sometimes characterized as including host systems and memory systems. The host systems perform mission functions and usually operate with logical addresses that provide a layer of abstraction between the host system software and the physical memory in the memory systems. The memory systems include controller modules that maintain tables used to perform logical to physical address translation and other memory management operations, and translate the host level read and write requests based on logical addresses into the command structure and physical addresses used by the memory devices. See, for example, Gupta, et al., "*DFTL: A Flash Translation Layer Employing Demand-based Selective Caching of Page-level Address Mappings*," ASPLOS'09, Mar. 7-11, 2009, Washington, D.C., USA.

The memory systems are designed with the intent that the memory management operations are executed in a manner to limit the amount of interference with the host mission functions. Also, memory management functions are performed in the background when possible, so that the host system is not notified or not "aware" of the memory management function. For example, in flash memory, memory controllers have been developed that execute Flash Translation Layer procedures that translate host read and write requests to device level commands in a way that hides the program and erase overhead of flash memory. These procedures can involve using a background operation in the controller using local memory and a sequence of commands to be provided to the flash memory device, to maintain a block in the physical memory that can be called a current data block CDB ready to accept a write, by selecting an available physical block, erasing it, and storing a system variable identifying the CDB. When a current data block CDB is full or otherwise exhausted, the status of the physical block is changed to identify it as original data (e.g. original data block ODB), and a new CDB is selected.

These procedures can also include other memory management functions to be performed in the background using commands provided to the flash memory device. Examples of background memory management functions include wear leveling, garbage collection, backup copying of critical parameters needed on reset or power-up, and so on. The background operations can also maintain system variables (such as roots of partial mapping tables, lists of executing blocks, erase counts, valid counts and so on) in a block that can be called a system information table SIT. Also, the system variables are backed up periodically using a background memory management function, or when possible, by copying to an available block in the flash memory. In some systems, the address translation tables are maintained using a cache-based algorithm which includes recording mapping relations in a cache mapping table CMT that identifies mappings that are already flushed to the flash memory and mappings that are not yet flushed.

If a host system generates a request to read or write data in the memory system, and the memory system is executing a background operation at the time the command is received using the flash memory device, then the memory system may not immediately respond to the host request. In cases in which the request from the host is time sensitive, such as some types of data read and status read requests for example, the execution of the mission function can be delayed, or a timeout condition can be signaled causing the host system to institute a response to the timeout condition. The responses executed depend on the particular mission function, and can vary widely. In some cases, a protocol for recovering from a memory command time out can have substantial impacts on the performance of the host system.

It is desirable to provide a controller which can avoid delays and timeout conditions at the host level during background memory management operations.

SUMMARY

The present technology provides a controller for a system, in which the controller quickly responds to sensitive requests, such as some types of read requests or other requests that can be safely executed, even during execution of background memory management operations.

In one aspect of the present technology, a controller for a memory system described herein includes a memory which executes memory commands using physical addresses and a host which provides host requests using logical addresses to request reads or writes of data in the memory. The controller comprises a host interface and a memory interface and logic configured to decode host requests received at the host interface, and to execute memory command cycles using the memory interface. Memory command cycles include delivering a memory command to a memory device and determining when the memory device is ready for a next command. The memory command cycles arise from execution of host request that can comprise one or more commands on the memory interface, and from execution a memory management operation that can comprise a plurality of commands on the memory interface. Thus, in embodiments described herein, in an event of a host request of a specified type during execution of the memory management operation, when the memory interface is ready before completion of the memory management operation, the controller logic selects a memory command for the host request as a current command for a memory command cycle, and can thereafter resume the memory management operation.

In parallel with memory command cycles in the memory device, the logic can monitor and decode host requests, and identify a particular type or types of host requests, such as requests that are pre-specified because for example they are time-critical and require memory commands that are safe to execute during the memory management operation. In an event of an identified type of host request during execution of the memory management operation, the logic can suspend the memory management operation and save a state of the memory management operation, and upon completion of a currently executing memory command cycle before a final command, execute the host request. Upon completion of the memory command cycle in support of the host request, the logic in the controller can resume the memory management operation according to the saved state. In an event of a host request other than one of the pre-specified types during execution of the memory management operation, the logic continues the memory management operation without interruption.

In another aspect of the present technology, a method of controlling operations of a controller for a memory system is described herein. The controller includes a memory interface coupled to a memory, a host interface coupled to a host, and logic to execute operations. The method described comprises:

executing a memory management operation, the memory management operation comprising a plurality of memory command cycles;

in an event of a host request of a specified type received at the host interface of the controller during said executing the memory management operation, suspending the memory management operation when ready in a current memory command cycle in the plurality of memory command cycles before a final stage, and executing the host request while the memory management operation is suspended; and in an event of a host request other than a host request of a specified type received at the host interface of the controller during said executing the memory management operation, continuing the memory management operation.

Other aspects and advantages of the present technology can be seen on review of the drawings, the detailed description and the claims, which follow.

DETAILED DESCRIPTION

A detailed description of embodiments of the present technology is provided with reference to the FIGS. 1-4.

Figure 1:
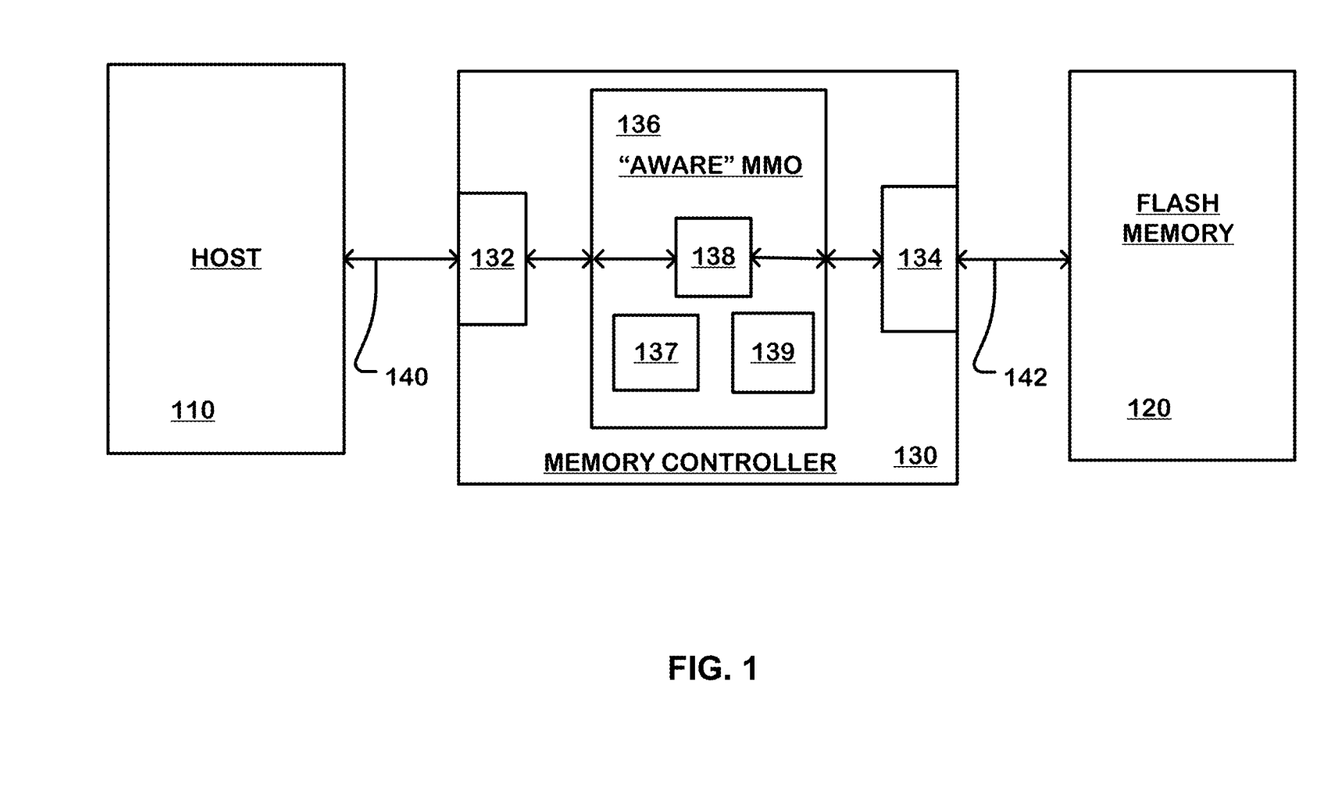
FIG. 1 illustrates a functional block diagram of a system including a memory controller with "aware" memory management operation MMO logic in one embodiment.

FIG. 1 illustrates a simplified functional block diagram of a system, which comprises a memory controller 130 coupled to a flash memory 120 and also coupled to a host 110. The controller 130 includes control circuitry 136, a host interface 132 and a memory interface 134. The controller 130 controls communications with the flash memory 120, by translating requests from higher level functions in the host 110 into commands in the format required for the flash memory interface 134.

The memory controller 130 can include a processor that performs higher level functions, including "aware" memory management functions, including background functions. The memory management functions deliver commands for memory operations needed to support the memory management functions. The memory management functions are aware of high priority host requests, and can provide for efficient and quick response.

The host 110, for example a computer system executing higher level mission functions, delivers requests (e.g. write and read) to the host interface 132 of controller 130 through a communication bus 140 in support of the mission functions. The host can also execute background functions such as memory management functions in some embodiments.

The host interface 132 can include buffers and/or registers used to store the host requests during the communications.

The communication bus 140 can comprise peripheral component interconnect (PCI) bus, peripheral component interconnect express (PCIe) bus, serial ATA (SATA), and other appropriate communication protocols.

The controller 130 can communicate through the memory interface 134 with the flash memory 120 through a data bus 142, which can be parallel or serial. Likewise, the memory interface 134 can include buffers and/or registers used to store commands and data being communicated across the bus 142.

The flash memory 120 can be a single-bit-per-cell or multiple-bit-per-cell NAND non-volatile flash memory device or a set of devices such as in solid state drive memory technologies for example. In other examples, the flash memory 120 can comprise other types of non-volatile memory devices, including single-bit-per-cell or multiple-bit-per-cell NOR flash, phase change memory, magnetic memory, metal oxide programmable resistance memory and so on.

The control circuitry 136 in memory controller 130 includes logic 137, including for example a state machine and other processing resources. The logic can comprise programmable logic circuits, dedicated logic circuits, a general purpose processor with software control, and combinations of the various types of logic. The logic 137 can for example execute Flash Translation Layer FTL functions including virtual-to-physical address translations, and hide the erase-before-write characteristics of flash memory. Also, the logic 137 can execute a variety of memory management operations, such as wear leveling and garbage collection.

The control circuitry 136 also includes a data buffer 138, which is configured to store data transferred into and out of the flash memory 120 and into and out of the host 110.

The control circuitry 136 can include working memory 139 in which local copies of address translation tables, like logical-to-physical (L2P) translation tables, parameters and look-up tables, are stored when in use. Also, the control circuitry 136 can store system information tables in the working memory 139, where the system information tables include write counts, erase counts and valid counts for related physical locations in support of operations such as garbage collection and wear leveling.

The logic 137 in the control circuitry 136 also performs, in some embodiments, operations to maintain or backup copies of data in the working memory 139 to corresponding blocks in the non-volatile flash memory 120 for use in recovery of the data during startup, and to handle such data in a caching process. During an initiation of the memory system, the controller 130 can copy the address translation tables and system information tables from corresponding cache management table blocks and system information table blocks in the flash memory 120 to the working memory 139.

The control circuitry 136 includes logic which decodes host requests received at the host interface 132 to produce memory commands for delivery to the memory interface 134 to perform the received host requests. Per the host requests, data are read from or written to the flash memory 120.

Figure 2:
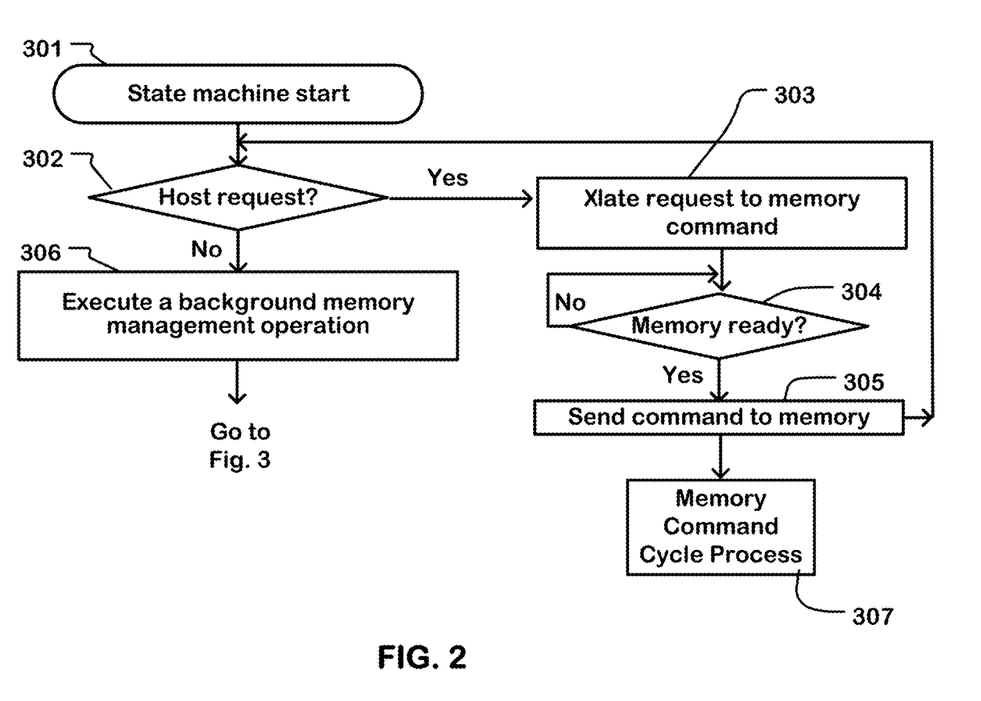
FIG. 2 illustrates a flow chart for the control function of the controller in one embodiment.

FIG. 2 is a flowchart illustrating a method executed by logic in the memory controller 130 in support of flash translation layer operations in this example to execute the host requests and to execute memory management operations. The logic includes a state machine, which is started at power-up, or other event associated with operation of the memory system (301). The logic monitors the host interface to determine whether a host request is present (302). If a host request is present, then the host request is decoded, which involves translating requests to one or more memory commands (303) by logic in the controller, such as logic 137 of FIG. 1. Logic then determines whether the memory device is ready to accept a next command (304). If the memory is not ready, then the logic waits. In cases in which the wait is too long, the host request may be cleared. If the memory is ready in time, then the command that supports the host request is sent to the memory device using the memory interface (305). The logic then performs a memory command cycle process, in which any necessary transfers across the memory interface are performed, and the memory interface is monitored for busy/ready signals from the memory device, or for other conditions which can indicate that the memory interface is ready to accept a next command (307).

During the memory command cycle process 307, the memory controller can poll the host interface for a next host request. The detection of the host request 302, and the decoding 303 of the host request can be executed in parallel with the memory command cycle process 307. Thus, steps 302, 303 and 304 can be executed in parallel with and overlapping in time with a currently executing memory command cycle, and can be part of a memory command cycle process 307 in the controller.

The length of the memory command cycle varies depending on the particular memory command being executed, the particular memory device being utilized and other variables. Also, the determination of whether the memory interface is ready for a next command at step 304 can be made based on different conditions according to the particular commands being executed, and the nature of the next command. Typically, the memory device generates a ready/busy signal on the memory interface which can be used to detect completion of a current memory command cycle, at which time the memory interface is ready to receive a next command. Some memory devices are capable of executing a read status while write operation. In a read status while write operation, the memory interface can be ready to receive a read status command during the execution of and before completion of a program operation.

Figure 3:
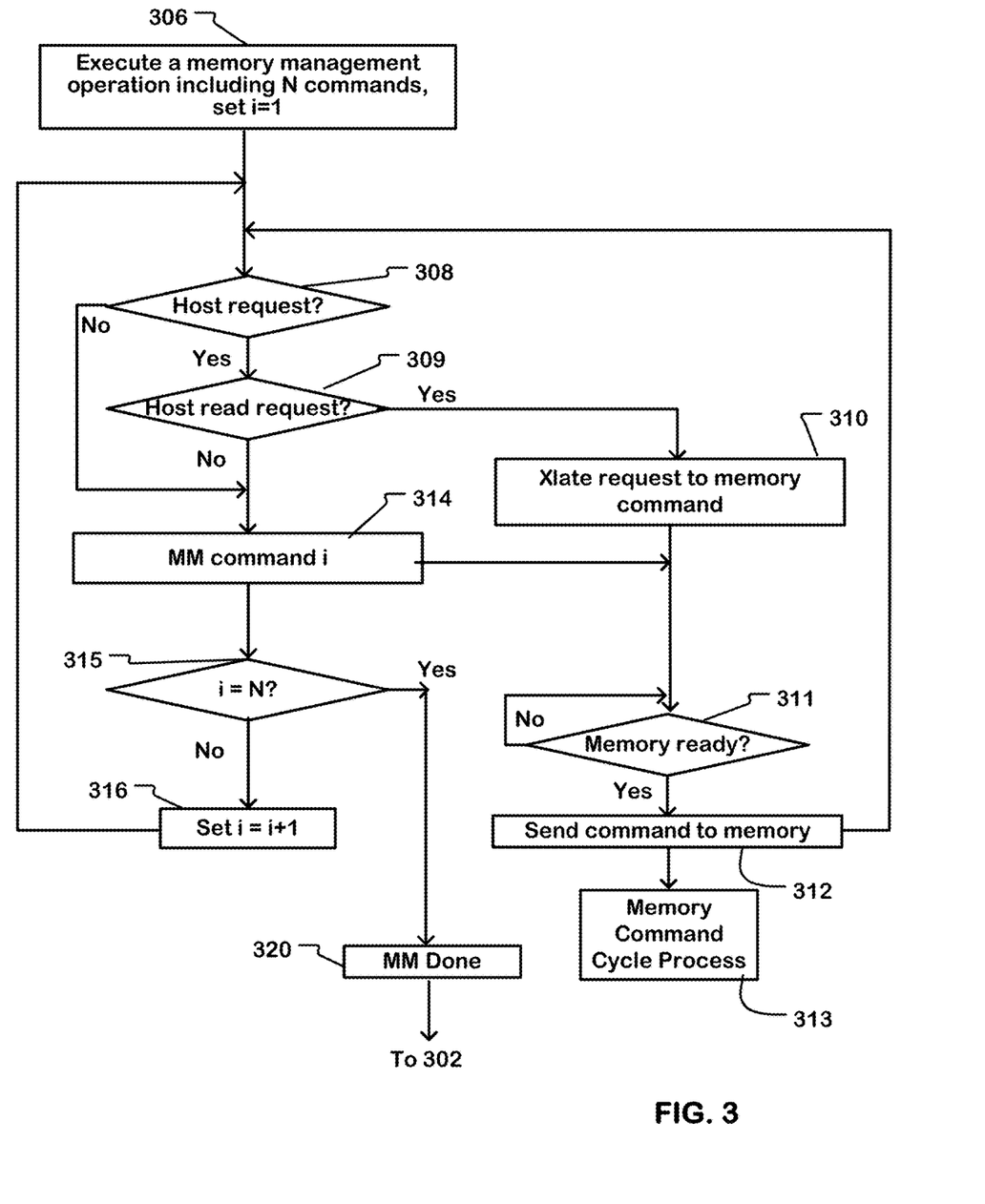
FIG. 3 illustrates a flow chart for the control function of the controller during a memory management operation in one embodiment.

In this example method, if at step 302 there is no pending host request on the host interface, the logic can execute a background memory management operation (306). The background memory management operation can be queued by the memory controller without involvement of the host system. Memory management operations are executed from time to time in support of the memory controller, and can include flash translation layer operations as discussed above. Execution of a background memory management function can be performed as shown in FIG. 3.

A request to write data to a NAND flash memory device can arise from a foreground operation initiated by the host, or from a background operation or memory management operation initiated by the memory controller. An example write flow as executed by the controller upon decoding a host write request can include the following:

A. Checking whether the CDB has a blank page, and if so programming the data subject of the write request to the blank page using a memory command, and go to step H below. If the CDB is full, and does not have an available blank page, then a new CDB must be established, and go to step B.

B. Picking an unused block as the new CDB and erasing the new block using a memory command. After erasing, the cache management table and system information table need to be synchronized. Go to step C.

C. Checking whether the CMT block in the memory has a blank page to which the new CMT entries can be stored. If the CMT block is full, then go to step D to set up a new CMT block. If the current CMT block has an available blank page, then program the local CMT entries to the blank page using a memory command. Go to step E.

D. Pick an unused block for the new CMT block, and erase the unused block using a memory command. After erasing, copy (flush) the new CMT entries to the new CMT block using a memory command and go to step E.

E. After flushing the local copies of the CMT, determining whether the system information table SIT includes a blank page in which to synchronize all of the changed information. If it does not include a blank page, go to step F. Otherwise go to step G.

F. Pick an unused block for the new SIT block, and erase the unused block using a memory command. After erasing, copy the new SIT entries to the new SIT block using a memory command, registering the CMT block and the CDB. Then go to step G.

G. After synchronizing the flash translation layer tables, program the host data to the available page in the CDB using a memory command.

H. Also, the logic updates the logical-to-physical L2P mapping entries in the cache management table.

In contrast, execution of a host read request is much simpler. It can involve the following steps:

A. Finding a physical address by translating the logical address of the read request using the L2P table in the controller and generating a memory command to execute the read.

B. Loading the data across the memory interface to the physical address.

C. Sending the data across the host interface to the host.

As can be seen, a read request does not program the CDB or CMT in the NAND flash memory, and therefore does not change the L2P mapping used by the controller. Execution of a write request from the host on the other hand does change the mapping, and for this reason write requests must be performed sequentially. Otherwise the flash translation layer might not be able to accurately identify the newest data in its control tables between the foreground host request, and an executing background operation. This requirement for sequential operation for safe execution of write requests limits flexibility in the implementation of memory controller functions.

From these flows it can be seen that a background operation (e.g. steps B-F) can be required to safely perform a write operation in response to a write request from the host. These operations can be queued by the operation of step 303 in FIG. 2 which translates the host request to one or more memory commands. Also, background operations that include a plurality of memory commands can be queued for execution in a variety of other circumstances in support of wear leveling, garbage collection and other procedures known to be part of flash translation layer operations. These background operations can be queued for execution based on a timer, based on events that arise during management of the memory, and based on a variety of factors and combinations of factors. In some embodiments, background operations can also be queued for operation, or executed, using a host request or host requests.

FIG. 3 is a flowchart illustrating a method executed by logic in the memory controller 130 in support of flash translation layer operations in this example to execute memory management operations corresponding to step 306 of FIG. 2. Thus, the flowchart of FIG. 3 begins with block 306 where the controller selects a memory management operation including a number N of memory commands, and sets a state variable "i" to an initial value of 1 in this example. This memory management operation maintains an awareness of host requests that appear on the host interface during the memory management operation, including during execution of memory command cycles other than, and before, the last memory command cycle of a memory management operation.

Thus, in this example, the memory management operation includes logic to poll the host interface for host requests, and to decode the host request in parallel with a memory command cycle process that is currently executing. Thus, the step of determining whether a host request is present on the host interface is performed (308). The host request, if present, is decoded to determine whether it is a host read request (309), or a host request of a pre-specified type which is safe to execute during the memory management operation being executed. If there is a read request at the host interface (309), it is decoded or otherwise translated to a memory command or sequence of memory commands (310), one of which is queued for deliver to the memory.

If there is no pending host request (308) or the pending host request is not a read request or other pre-specified type (309), then the memory management operation provides the memory management command i to the memory interface (314).

After the next command to be executed is provide at step 310 or step 314, and if the memory interface is ready (311), then the command is sent to the memory device (312). Upon sending the command to the memory device 312, a memory command cycle process is executed (313), as discussed above.

In addition, and in parallel with sending the command at block 314 to the memory interface, the state variable "i" is checked to determine whether the last command in the memory management operation has been sent to the memory interface; i.e., whether i=N (315). If the last command has been sent, then the memory management operation is done upon completion of the final memory command cycle process and any further local processing for the function, and the procedure loops back to step 302 of FIG. 2. If the last command has not been sent, then the state variable is incremented by setting i=i+1 (316), and the procedure loops to block 308 to determine whether there is a pending host request. If the last command of the memory management operation has been sent, then the operation is done upon completion of that last memory command operation cycle (320).

These procedures 315, 316, 308, 309 can be executed in parallel, overlapping in time, with the currently executing memory command cycle process.

As mentioned above, the detection of whether a pending host request is present at step 308 can be executed in a polling operation which reads the host interface at preset time intervals, in some embodiments. In other embodiments, the presence of the pending host requests can be determined at other times after the sending of each command in the memory management operation.

As can be seen, FIG. 3 illustrates an embodiment of logic that in an event of a host request of a specified type during execution of a memory management operation, saves the state of the memory management operation (e.g. the state variable i), and when the memory interface is ready, selects a memory command for the host request as a current memory command. The logic also determines when the memory interface is ready for a next memory command. When the memory interface is ready, the logic selects a next memory command (command i+1) for the memory management operation according to the saved state (i) for the next memory command cycle. This breaks the memory management operation, and allows execution of certain types of host requests while the memory management operation is suspended. Upon completion of the host request, the memory management operation can resume using the saved state.

Also, FIG. 3 illustrates that in the event of a host request in this embodiment, other than the specified type during execution of a memory management operation, the next command selected is a command for the memory management operation.

A number of flowcharts illustrating logic executed by a memory controller or by a memory device are described herein. The logic can be implemented using processors programmed or using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a rearrangement of steps will achieve the same results only if certain other changes are made. In other cases, as the reader will appreciate, a rearrangement of steps will achieve the same results only if certain conditions are satisfied. Furthermore, it will be appreciated that the flowcharts herein show only steps that are pertinent to an understanding of the invention, and it will be understood that numerous additional steps for accomplishing other functions can be performed before, after and between those shown.

Figure 4:
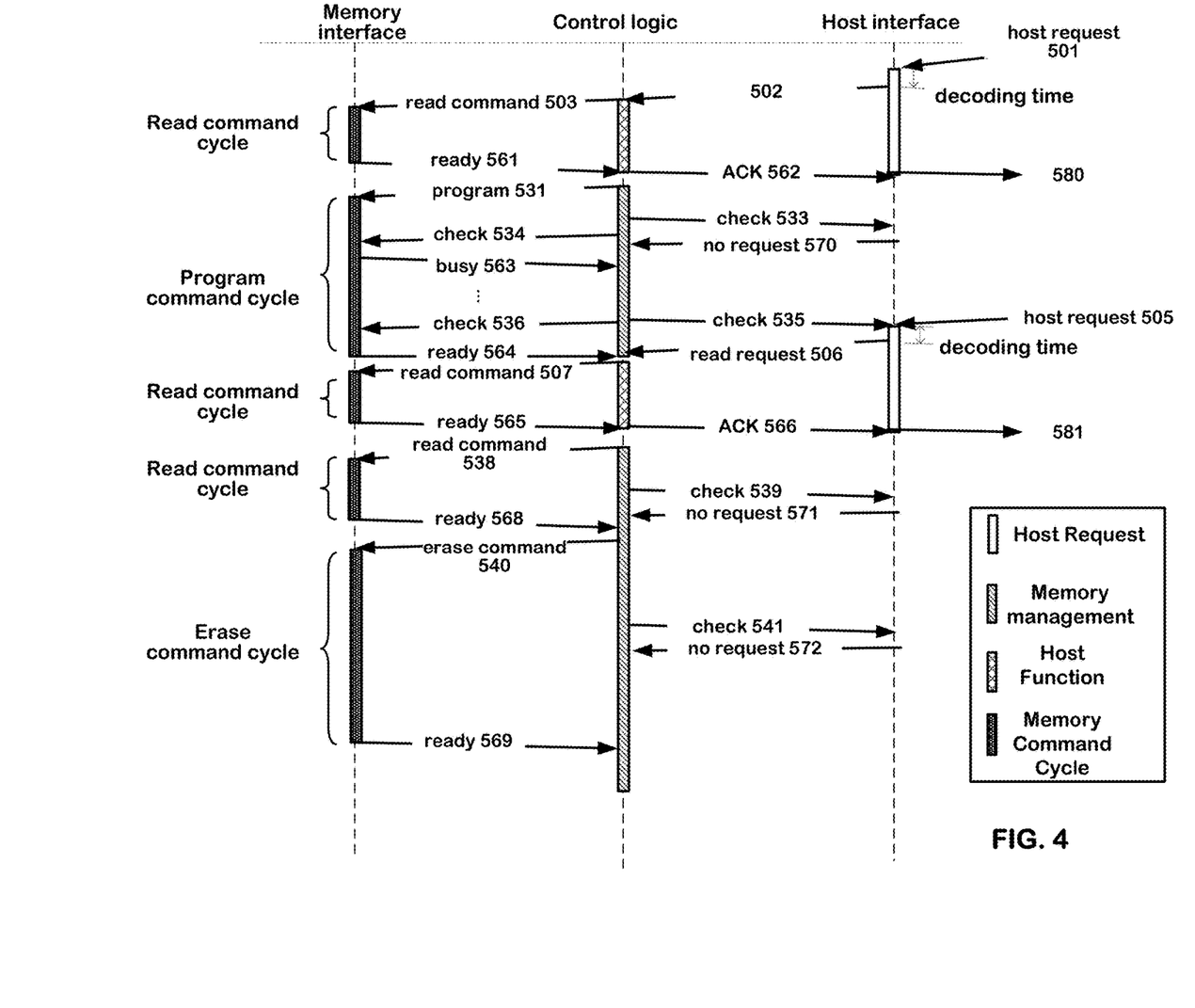
FIG. 4 is a sequence diagram illustrating operations executed by a controller implemented in a memory system in one embodiment.

FIG. 4 is a sequence diagram illustrating timing of operations of a memory controller as described herein.

The sequence diagram includes the column for the host interface of the memory controller on the right, the column for the control logic in the memory controller in the center, and a column for the memory interface of the memory controller on the left. Vertical timelines in the control logic column are coded by hatching to indicate a memory management operation, and a host function as reflected by the legend in the lower left. The control logic can execute the process shown in FIG. 2 and FIG. 3 for example.

The first event in the sequence comprises a host read request 501 at the host interface, which after a decoding time is passed in decoded form to the control logic (502). (In the sequence diagram, the decoding time is reflected at the host interface for the purposes of illustration. The logic that performs the decoding may be physically located anywhere on the device.) The control logic then produces a read command or set of read commands to execute the read request 503 and provides it to the memory interface, beginning a memory read command cycle process. Upon completion of a memory read command, the flash memory 120 provides a ready signal 561 to the memory interface, which is passed to the control logic indicating the end of the memory read command cycle process, which in turn provides the read data to the host interface and produces an acknowledgment 562. The read data is delivered to the host, using for example a dynamic memory access DMA protocol (580). If the host request requires multiple memory device reads, then a read loop can be executed. For example, if a host request identifies logical block address 0x0 with a length of 0x100, in 512 (dec) byte units, then the read request is seeking to read about 131K bytes. For a memory device having a page read that is 16K bytes, then the host request can be translated in the flash translation layer to 8 page read commands, which can be executed in sequence by the controller.

After the ready signal 561, the control logic can determine that time is available for execution of a memory management operation which may include for example a program command 531 to the memory. During the memory management operation, the control logic can check (534) the status of the memory interface for completion of the program operation in the memory. While the program operation proceeds, the memory interface receives a busy signal (563) from the memory. Also, the control logic can monitor the host interface for host requests by checking (533) for host requests at the host interface. The host interface may have no request pending (570) at the time of check 533 as illustrated in this example.

The control logic during the memory management operation can continue to check (536) the memory interface for a ready status. When the memory interface receives a ready signal (564), the control logic can determine that it is ready for a next command.

As illustrated in this example, the control logic can, in parallel with the program command cycle, continue to check (535) the status of the host interface before receiving the ready signal 564 from the memory interface. In this example, a host read request 505 is detected at the host interface before the ready signal 563. After a decoding time, the read request in decoded form 506 is provided to the control logic. Thus, upon receipt of the ready signal 563, the control logic is at the end of a memory command cycle of the memory management operation as discussed above. At that time, the memory management operation can be suspended and commands needed to execute the host read request can be passed to the memory interface. In this example, the read command 507 (or set of read commands) for the host request is provided as the next command to the memory interface, and a read memory command cycle is entered. Upon completion of the memory operation cycle for the read command 507 in the memory, the memory interface can detect a ready signal 565 from the memory device. The read data and acknowledge signal 566 are provided to the host interface and the data returned to the host 581. Again, a plurality of commands at the physical memory layer may be produced in the flash translation layer to respond to a single host request.

In this example, when receiving the ready signal 565, no pending host request is found, and the control logic can resume the memory management operation, by sending a read command 538 to the memory interface to begin a next stage in the memory management operation. In parallel with the read memory operation cycle, the control logic continues to monitor the host interface, using check 539 and response 571.

Upon completion of the read command as indicated by the ready signal 568 at the memory interface, the control logic finds no pending host request, and provides the next memory command, erase command 540 in this example, in the memory management operation to the memory interface. The device enters an erase memory operation cycle at this point, which ends at ready signal 569. In parallel with the erase memory operation cycle, the control logic continues to monitor the host interface, using check 541 and response 572.

The sequence diagram of FIG. 4 demonstrates significant improvements in efficiency of the memory controller functions, including pipeline like performance of host request decoding and prioritizing host requests that are time sensitive and safe over background operations, when the background operations are in a safe state.

Thus, the controller issues one or more memory commands to the memory interface as part of execution of the host request, and issues one or more memory commands to the memory interface as part of the memory management operation. Also, the control logic determines completion of the memory command cycle by determining when the memory interface indicates that the memory is ready after completion of a memory command, or otherwise, issued as part of the memory management operation.

The control logic in the memory controller can execute background memory management operations, while being aware of pending host requests. Any pending host requests that can be executed safely at the end of a memory command cycle of the memory management operation can cause the control logic to suspend the memory management operation and allow the host operation to complete without undue delay. Also, pending host requests can be decoded during decoding time that overlaps in time with the memory command cycles of the memory interface which are part of the memory management operation. This overlapping of the decoding time can allow the memory management operation to determine the type of host request pending, and can reduce the time required to begin execution of the command after suspending the memory management operation.

In general, the background memory management operation can be configured to steal time during an idle state of the host system in which it can reclaim, recover or examine block status in the non-volatile memory, or perform other memory management operations that reduce system error risk or improve performance. Such background operations may involve several page program and block erase operations in a non-volatile memory such as a NAND flash memory, and therefore can consume a significant amount of time. There is a risk therefore that the idle state of the host system may end during execution of the background operation. In this case, the memory controller may not be able to immediately respond to a host request. If the request is time sensitive, such as a read command, then the host system operation is negatively affected.

A method of controlling execution of operations in a memory system using flash translation layer functions is described, where the memory system includes a controller comprising a host interface coupled to a host and a memory interface coupled to a memory, such as a NAND flash memory. The method in some embodiments comprises:

executing a flash translation layer operation including a plurality of memory command cycles using the memory interface;

during the flash translation layer operation while the memory interface is not ready, determining if a read request is received at the host interface;

suspending the flash translation layer operation when the memory interface is ready upon completion of one of the plurality of memory command cycles before a last memory command cycle of the flash translation layer operation and saving a state of the flash translation layer operation;

executing a memory command cycle using the memory interface for the read request;

resuming the flash translation layer operation according to the saved state; and executing host requests other than the read request when the memory interface is ready upon completion of the last memory command cycle of the plurality of memory command cycles of the flash translation layer operation.

A memory controller comprising logic to perform the just mentioned method is also provided.

The technology described herein provides a memory controller which polls or otherwise monitors the host interface for host requests during execution of a background memory management operation. The memory controller can utilize a busy status time during execution of memory operation such as program, erase or read operations to detect and decode host requests. When a high priority host request is received, such as a read data request, the memory controller can prioritize operations to execute the host request while suspending the background memory management operation in a safe memory command cycle. Thus, the memory management operation can be operated in a manner that is "aware" of pending high priority host requests, and can respond to such requests by suspending the memory management operation, saving its state, and resuming it when the host request is completed.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A controller for a memory system comprising:
a host interface and a memory interface; and
logic configured to execute host requests received at the host interface, and to execute a memory management operation comprising a plurality of memory command cycles, wherein:
in an event of a host request of a specified type during execution of the memory management operation, when the memory interface is ready at the end of a memory command cycle in the plurality of memory command cycles in the memory management operation before completion of the memory management operation, the logic selects a memory command for the host request as a current command for a memory command cycle.

2. The controller of claim 1, wherein the logic saves a state of the memory management operation during the memory command cycle of the selected memory command, and when the memory interface is ready selects a memory command for the memory management operation according to the saved state for a next memory command cycle.

3. The controller of claim 1, wherein the logic is configured so that in an event of a host request other than the specified type during execution of the memory management operation, the logic selects a following command for the memory management operation for a next memory command cycle.

4. The controller of claim 1, including logic to execute the memory management operation which polls the host interface for host requests during times in which the memory interface is not ready for a next memory command cycle.

5. The controller of claim 1, wherein the specified type of host request includes a read request.

6. The controller of claim 1, the logic decoding host requests on the host interface to identify the specified type during time overlapping with a current memory command cycle.

7. The controller of claim 1, wherein the memory management operation comprises flash translation layer functions.

8. The controller of claim 1, in an event of a host request when the memory management operation is not being performed, the logic selects a following command for the host request for a next memory command cycle using the memory interface.

9. A method of controlling operations of a controller for a memory system, the controller including a memory interface coupled to a memory, a host interface coupled to a host, and logic to execute operations, the method comprising:
executing a memory management operation, the memory management operation comprising a plurality of memory command cycles, including:
in an event of a host request of a specified type during execution of the memory management operation, when the memory interface is ready at the end of a memory command cycle in the plurality of memory command cycles in the memory management operation before completion of the memory management operation, selecting a memory command for the host request as a current command for a memory command cycle using the memory interface.

10. The method of claim 9, including saving a state of the memory management operation during the memory command cycle of the selected memory command, and when the memory interface is ready selecting a memory command for the memory management operation according to the saved state for a next memory command cycle.

11. The method of claim 9, including in an event of a host request other than the specified type during execution of the memory management operation, selecting a following command for the memory management operation for a next memory command cycle using the memory interface.

12. The method of claim 9, including polling the host interface for host requests during times in the memory management operation in which the memory interface is not ready for a next memory command cycle.

13. The method of claim 9, wherein the specified type of host request includes a read request.

14. The method of claim 9, including decoding host requests on the host interface to identify the specified type during time overlapping with a current memory command cycle.

15. The method of claim 9, wherein the memory management operation comprises flash translation layer functions.

16. The method of claim 9, in an event of a host request when the memory management operation is not being performed, selecting a following command for the host request for a next memory command cycle using the memory interface.

17. A method of controlling execution of operations in a memory system, the memory system including a controller comprising a host interface coupled to a host and a memory interface coupled to a memory, the method comprising:
executing a flash translation layer operation including a plurality of memory command cycles using the memory interface;
suspending the flash translation layer operation when the memory interface is ready and saving a state of the flash translation layer operation;

executing a memory command cycle using the memory interface while the flash translation layer operation is suspended for a read request received at the host interface;

resuming the flash translation layer operation according to the saved state.

18. The method of claim 17, including detecting the host read request before suspending the flash translation layer operation.

19. The method of claim 17, including executing host requests other than the read request when the memory interface is ready upon completion of the last memory command cycle of the plurality of memory command cycles of the flash translation layer operation.

20. The method of claim 17, wherein the flash translation layer operation includes a background operation.

\* \* \* \* \*